United States Patent [19]

Brown

[11] 4,274,753

[45] Jun. 23, 1981

[54] NON-ORAL COMMUNICATION DEVICE

[76] Inventor: David L. Brown, R.R. 1, Box 126, Park Rapids, Minn. 56470

[21] Appl. No.: 947,474

[22] Filed: Oct. 2, 1978

[51] Int. Cl.$^3$ .............................................. B41J 5/30
[52] U.S. Cl. ...................................... 400/87; 400/83; 340/365 R
[58] Field of Search ...................... 400/83, 87, 88, 110; 340/365 R, 365 A, 365 C, 365 E, 365 L, 365 P, 365 S, 365 VL, 147 R

[56] References Cited

U.S. PATENT DOCUMENTS

| 2,427,214 | 9/1947 | Kao ....................................... 400/110 |
| 2,458,339 | 1/1949 | Buhler et al. .......................... 400/110 |
| 3,246,315 | 4/1966 | Gear .............................. 340/365 S X |
| 3,507,376 | 4/1970 | Kafafian ....................... 340/365 S X |
| 3,651,512 | 3/1972 | Summers .......................... 340/365 R |
| 3,818,448 | 6/1974 | Wilkins ............................ 340/147 R |
| 3,820,644 | 6/1974 | Yeh ....................................... 400/110 |
| 3,848,249 | 11/1974 | Meiri ........................... 340/365 S X |
| 3,854,131 | 12/1974 | Vanderheiden et al. ......... 340/365 L |
| 3,925,779 | 12/1975 | Gerstenhaber ........... 340/365 VL X |
| 3,950,734 | 4/1976 | Li ...................................... 400/110 X |
| 3,982,236 | 9/1976 | Kafafian ....................... 340/365 E X |
| 3,986,030 | 10/1976 | Teltscher ..................... 340/365 P X |
| 4,048,439 | 9/1977 | Gabus .......................... 340/365 R X |
| 4,092,599 | 5/1978 | Yee et al. ..................... 340/365 R X |

FOREIGN PATENT DOCUMENTS

| 1236110 | 6/1971 | United Kingdom ...................... 400/87 |
| 1417848 | 12/1975 | United Kingdom ...................... 400/87 |
| 1439591 | 6/1976 | United Kingdom ...................... 400/87 |

OTHER PUBLICATIONS

IBM Technical Disclosure Bulletin, "Character Display and Input Device", Altman, vol. 15, No. 5, Oct. 1972, p. 1619.
IBM Technical Disclosure Bulletin, "Electronic Typewriter For The Handicapped", Soding, vol. 19, No. 5, Oct. 1976, pp. 1624–1625.
Medical and Biological Engineering, "An Alphanumeric Display as a Communication Aid for the Dumb", Newell et al., Jan. 1975, pp. 84–88.
Electronics, "Communicator Aids Palsy Victims", May 11, 1978, p. 42.
Electronics, "Communicators Help the Handicapped", Hamilton, Jun. 8, 1978, 3 pages.
Electronics, "Electronic Voice System Generates Messages for Vocally Handicapped", Nov. 10, 1977, pp. 32,35.
"Introducing the Phonic Mirror Handivoice", 4 pages.

*Primary Examiner*—Ernest T. Wright, Jr.
*Attorney, Agent, or Firm*—Merchant, Gould, Smith, Edell, Welter & Schmidt

[57] ABSTRACT

A non-oral communication device is disclosed. The device includes a single electrical switch actuable by an operator and movable between a first and second position. A memory stores a plurality of messages at a plurality of locations indexed by plural digit numbers. A selector circuit is provided for selecting one of the messages by its indexed plural digit number. The selector circuit includes a numeral display actuated by the switch. The numeral display has a plurality of digit locations at which numerals can be displayed. A mechanism cyclically displays different numerals at each digit location. A mechanism actuated by the switch is provided for choosing a displayed numeral at each digit location. A mechanism actuated by the switch transmits the numerals chosen to the memory after a complete plural digit number of a desired message has been chosen. A signalling mechanism signals a message display to display a selected message indexed by a chosen plural digit number.

9 Claims, 4 Drawing Figures

NON-ORAL COMMUNICATION DEVICE

BACKGROUND OF THE INVENTION

The invention relates to apparatus used for enabling persons incapable of speech to communicate. The apparatus of the present invention is specifically related to apparatus utilized by persons who in addition to a speech impediment also have severe mobility problems. Body motions of such individuals may be severely limited through either physical or psychological disorders. However, such individuals are frequently capable of moving at least one muscle. The movement of one muscle can thus be utilized to activate and deactivate a single switch. Alternatively, breath-actuated switches have been utilized to actuate prior art communication devices.

One type of non-oral communication apparatus already in use utilizes a pair of relays to change the position of a signal along both a column and a row. Messages or specific letters correspond to each column and row coordinate. Such devices, which store complete messages at coordinates, are limited in the number of messages which can be communicated to the size of the matrix formed by the columns and rows. The messages communicated by such devices generally are either illuminated on a board or transmitted to a printing device. A small matrix thus limits the number of messages which can be communicated. In prior art devices which utilize small matrices, the messages are frequently limited to urgent patient needs, such as a nurse call, a request for water, or an indication of pain.

As the matrix size increases to increase the number of messages which can be communicated, the problem of time consumption in reaching a specific column and row location through a relay mechanism increases. In a device disclosed in U.S. Pat. No. 4,048,439 to Gabus, each coordinate corresponds to one or two letters instead of a complete message. The letters can be selected and printed by the operator. This type of device allows an operator to create his own messages. However, time consumption becomes a problem because each column-row coordinate is assigned only one or two letters.

Another type of prior art communication device utilizes a keyboard to transmit a message in one form or another. However, a certain amount of mobility and dexterity of the operator is required to operate the keyboard. A keyboard type of apparatus is unsuitable for use by persons with severe mobility problems. A typewriter is of this type. Another keyboard type of apparatus, such as is shown in U.S. Pat. No. 3,925,779 to Gerstenhaber, utilizes a calculator type of keyboard and display wherein a plurality of messages are correlated to the various keys. The number of messages, however, is limited to the number of keys on the apparatus. The versatility of the calculator type of apparatus can be increased by the use of programmable circuit boards, however, for any circuit board, the number of messages is limited to the matrix size of the keys.

Another type of apparatus, such as is shown in U.S. Pat. No. 3,507,376 to Kafafian, uses finger contacts to control an X-Y keyboard to print messages. A considerable amount of dexterity is required to use this type of apparatus, since selective motion and contact between all of the fingers of an operator is required. Hence, such an apparatus cannot be used by seriously disabled persons with extreme mobility impairment.

In the types of apparatus described above wherein the message is not printed, a user is limited in the manner in which he can communicate. A person must be present to read the message prior to the user's communicating another message through the apparatus. A user is thus under stress to actuate the apparatus and communicate while a person is present. Frequently, seriously handicapped persons are alone for long periods of time in a hospital or nursing home and visitors are present for only a short period of time. Hence, severe pressure is placed upon the handicapped person to accurately operate the apparatus in order to compose and communicate as much as possible within the short period of time.

An apparatus which can print messages therefore has a distinct advantage over apparatus which cannot print. In the prior art devices discussed above which utilize printers, however, either the number of messages which could be printed is limited or the devices are time-consuming to utilize.

Another type of communication device has recently become available which increases the number and variety of messages. This device reproduces phonetic sounds to make up words. The device stores a number of basic complete words, as well as basic phonetic sounds. The words and sounds are coded and an operator accesses the words or sounds via either a keyboard or a single switch mechanism. Such a phonetic device, however, also suffers from the above-discussed deficiencies of nonprinting apparatus. That is, the presence of an individual to hear the message is required and the device is time-consuming to use. The user is thus placed under stress to accurately utilize the apparatus and compose messages in a relatively short period of time.

SUMMARY OF THE INVENTION

The present invention relates to a non-oral communication device. The device includes a single electrical switch actuable by an operator and movable between a first and a second position. A memory stores a plurality of messages at a plurality of locations indexed by plural digit numbers. A selector circuit is provided for selecting one of the messages by its indexed plural digit number. The selector circuit includes a numeral display actuated by the switch. The numeral display has a plurality of digit locations at which numerals can be displayed. A mechanism cyclically displays different numerals at each digit location. A mechanism actuated by the switch is provided for choosing a displayed numeral at each digit location. A mechanism actuated by the switch transmits the chosen numerals to the memory after a complete plural digit number of a desired message has been chosen. A signalling mechanism signals a message display to display a selected message indexed by a chosen plural digit number.

In the preferred embodiment, the signalling means signals a printer to print a selected message. Also, the selector circuit includes a multivibrator which cyclically generates a series of pulses that are passed through a digit decoder circuit to one of a series of counter circuits. Each of the counter circuits is connected to a separate driver/decoder circuit which receives signals indicative of numerals from an associated counter circuit and then decodes said last-mentioned signals to numerals for display on the numeral display means.

In the preferred embodiment, the selector circuit also includes a digit select counter circuit actuated by the switch and connected to the digit decoder circuit. The digit select counter circuit transmits a signal to the digit decoder circuit when the switch is actuated in order to stop the transmission of pulses from said multivibrator to a first counter circuit and to initiate the transmission of the pulses generated by said multivibrator to another counter circuit. A decimal point decoder circuit has inputs connected to the digit select counter circuit and a plurality of outputs each connected to one of a series of decimal point indicator lights. One of the indicator lights is disposed after each of the digit locations and the decimal decoder circuits successively lights the indicator lights after a numeral has been selected at a given digit location.

Various advantages and features of novelty which characterize the invention are pointed out with particularity in the claims annexed hereto and forming a part hereof. However, for a better understanding of the invention, its advantages, and objects obtained by its use, reference should be had to the drawing which forms a further part hereof, and to the accompanying descriptive matter, in which there is illustrated and described a preferred embodiment of the invention.

DETAILED DESCRIPTION OF THE INVENTION

Figure 1:
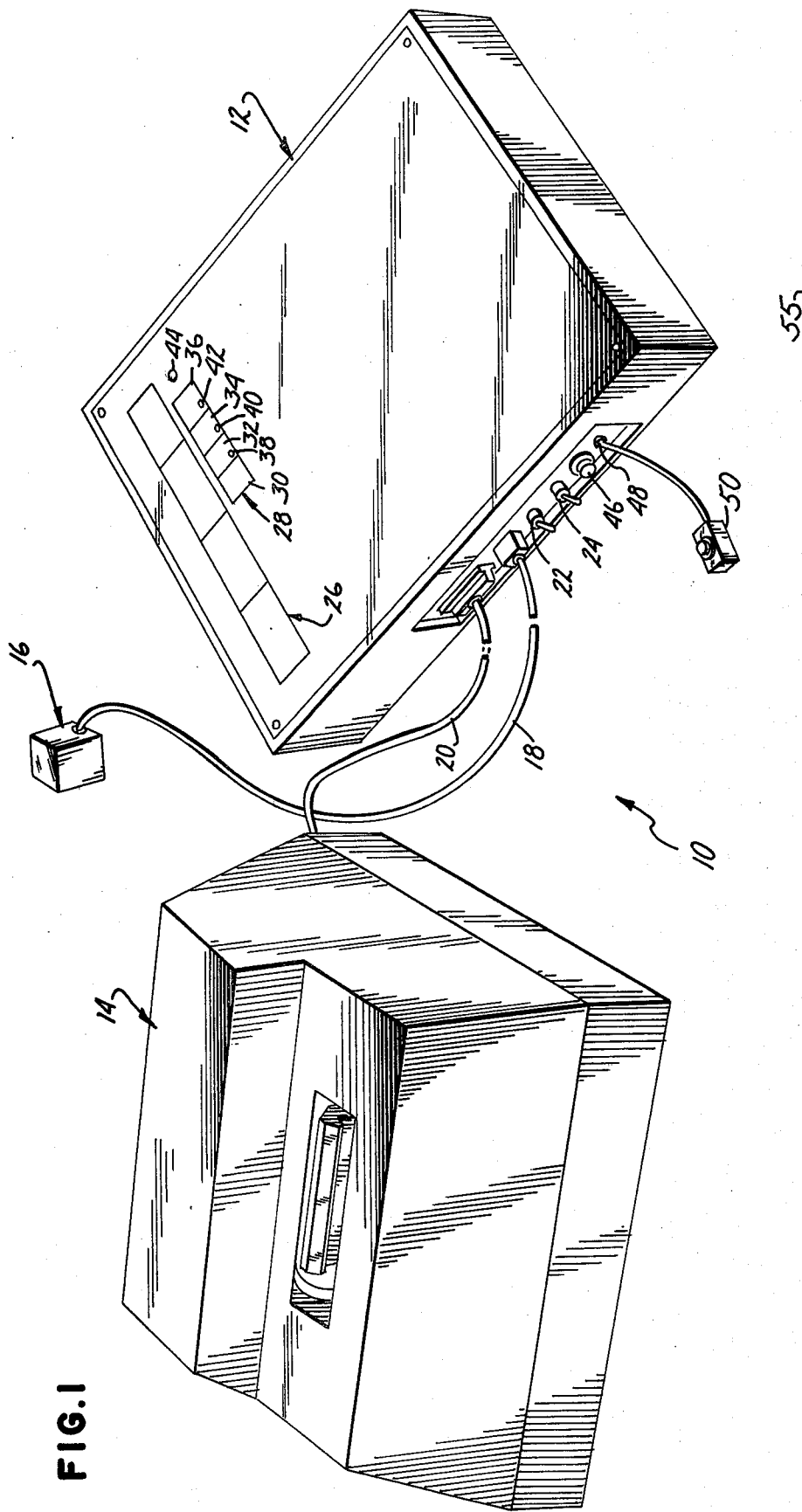
FIG. 1 is a perspective view illustrating various components of a device in accordance with the present invention.

Referring to the drawing in detail, wherein like numerals indicate like elements, there is shown in FIG. 1 a non-oral communication device indicated generally as 10. The device 10 includes a display board 12 and a printer 14. A power supply 16, which may be a low-voltage DC power supply, is connected to the display board 12 via a cable and connector 18. A data and signal cable 20 is connected between the display board 12 and the printer 14 to transmit signals between the display board 12 and the printer 14. A power switch 22 controls the application of power to the display board 12. A printer on-off switch 24 controls the operation of the printer 14. In its off position, a message will be displayed only on the display board 12 and will not be printed by the printer 14.

An alphanumeric display means 26 is mounted on the display board 12. Light-emitting diodes or liquid crystals can be utilized in the alphanumeric display means 26 to display a message. As will be more fully explained hereinafter, a plurality of messages stored within a memory 53 are each assigned a plural digit index number. The plural digit index number assigned to a desired message is selected by an operator and the message may be displayed on the alphanumeric display means 26 or printed by the printer 14. An address and four-digit display means 28 is mounted on the display board 12 below the alphanumeric display means 26. The address and four-digit display means 28 has a plurality of digit locations at digital displays 30, 32, 34 and 36. The address and four-digit display means 28 also includes a plurality of decimal point or digit indicators 38, 40, 42 and 44 in the form of illuminated periods or dots. The final digit indicator 44 serves as a print ready indicator. An address display frequency control 46 is mounted on the side of the display board 12. A jack 48 is utilized as an input from a single address select switch 50. The operation of the address and digit display means 28, the frequency control 46 and the select switch 50 will be explained hereinafter.

Figure 2:
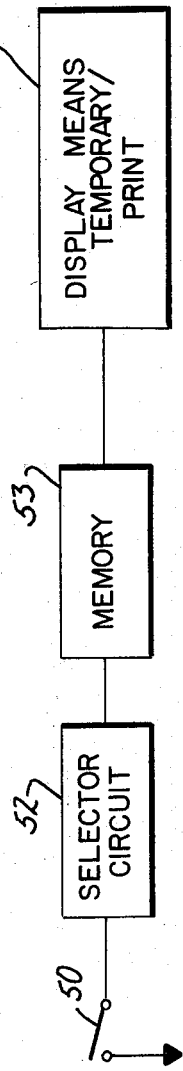
FIG. 2 is a diagrammatic illustration or flow diagram of the main operative components of the present invention.

FIG. 2 broadly illustrates the operation of the device 10. The select switch 50 is connected to and controls a selector circuit 52. The selector circuit 52 is in turn connected to a memory 53 which stores a plurality of messages at a plurality of locations indexed by plural digit numbers. Finally, the memory 53 is connected to a display means 55. The display means 55 may be a temporary display, such as the alphanumeric display means 26 or a print display such as the printer 14. The single address select switch 50 is operable to select a plural digit index number assigned to a desired message. The plural digit index number selected is transmitted to the memory 53 which in turn transmits the desired message to the display means 55.

Figure 3:
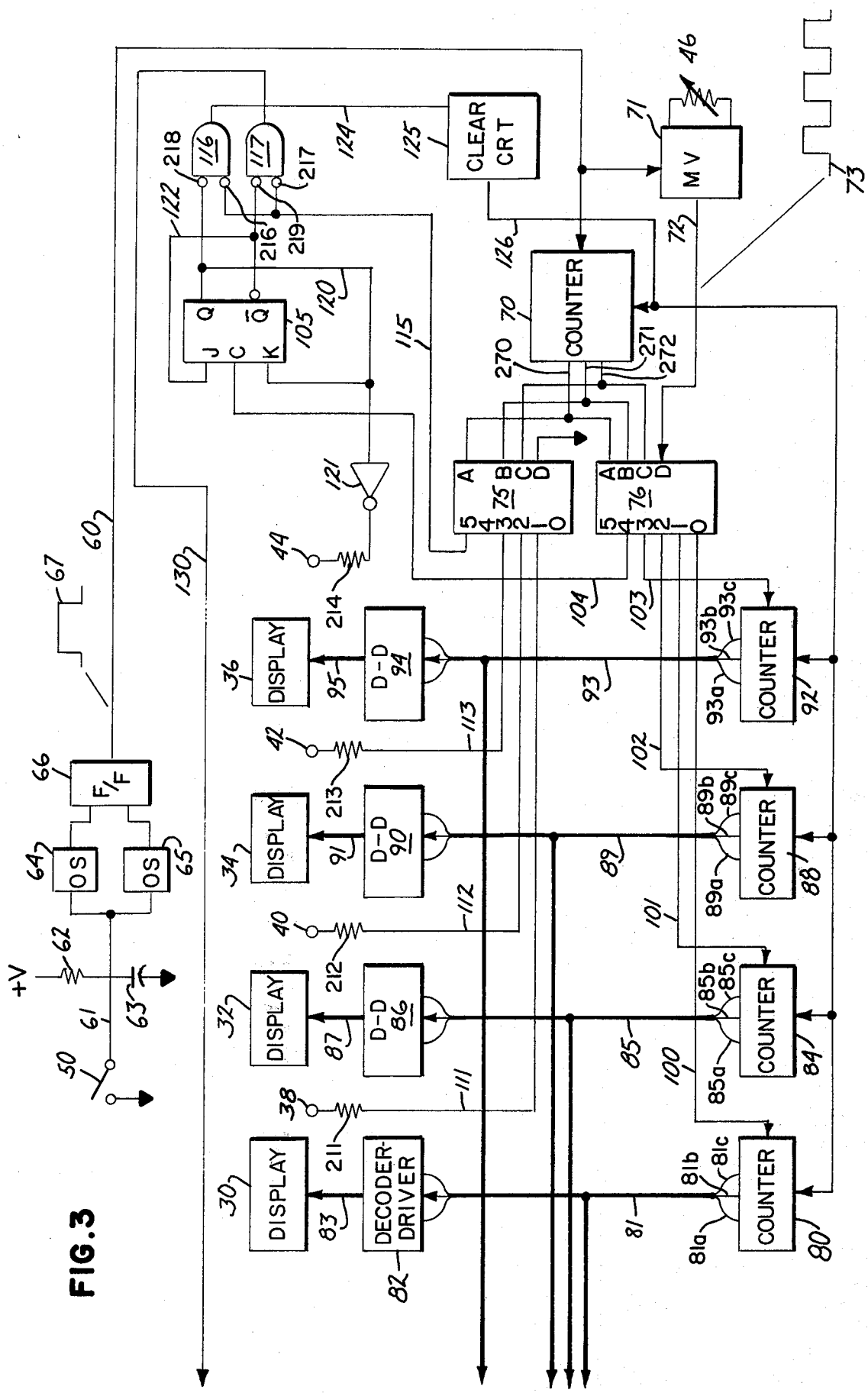
FIG. 3 is a diagrammatic circuit diagram illustrating a selector circuit in accordance with the present invention.

Referring now to FIG. 3, a schematic diagram of the preferred embodiment of the invention is shown. The operator activated select switch 50 is preferably a spring-loaded momentary contact switch. It connects to a lead 61 which connects through a resistor 62 to a source of working voltage indicated by the symbol +V. Lead 61 also connects through capacitor 63 to signal ground. Switch 50 when closed connects to signal ground. Lead 61 connects to a filtering and debouncing circuit which comprises a pair of one shot circuits 64 and 65, whose outputs connect to the inputs of a flip flop 66. One of one shot circuits 64 and 65 triggers when switch 50 is closed, and the other triggers upon opening of the switch 50. The on times of the one shot circuits 64 and 65 are selected to mask out any contact bounce or noise from the switch 50, and the outputs first set then clear flip flop 66, so as to provide a pulse as indicated by a waveform 67 on lead 60.

Lead 60 connects to a counter 70 and to a multivibrator circuit 71. Multivibrator 71 is normally a free running multivibrator which produces pulses at its output on lead 72 as indicated by waveform 73. However, during the duration of a pulse 67 on lead 60, multivibrator 71 is inhibited or blanked. The frequency of the pulses 73 may be adjusted by address display frequency control 46 in a manner as is generally known in the prior art.

Counter 70 is a binary counter, and three of its output bits are connected to the A, B, and C inputs of a pair of binary decoders 75 and 76 by leads 270, 271, and 272 respectively. These decoders 75, 76 are of a conventional design generally known in the prior art, and they function to provide an output at the appropriate one of a plurality of discrete outputs according to the binary number applied to inputs A through D. Since only outputs 1, 2, 3 and 5 are used, in the case of decoder 75, and only outputs 0 through 4, in the case of decoder 76, input D is not needed for decoder 75, and accordingly is tied to ground. In the case of decoder 76 input D is used for gating pulses 73, as will be explained hereinafter.

A plurality of counters are used for tallying the index number. In the preferred embodiment, four counters are used, and are indicated by reference numbers 80, 84, 88 and 92. The outputs of these counters 80, 84, 88, and 92 connect to decoder-drivers for the digital display.

Three outputs from each of the counters 80, 84, 88, and 92 are shown connected to leads 81a, 81b, 81c; 85a, 85b, 85c; 89a, 89b, 89c; and 93a, 93b, 93c, respectively. Counter 80 connects via lead 81 to decoder-driver 82, which in turn connects via data trunk 83 to digital display 30. In the case of data trunk 83, and elsewhere in FIGS. 3 and 4, a single thickened line is used to indicate a plurality of individual leads carrying parallel bits of data for a particular function, as is generally understood in the art.

In similar manner, counter 84 connects via data trunk 85 to decoder-driver 86, which in turn connects via data trunk 87 to digital display 32. In identical fashion, counters 88 and 92 apply their outputs to digital displays 34 and 36, by way of data trunks 89 and 93, decoder-drivers 90 and 94, and data trunks 91 and 95, respectively.

The 0 output of decoder 76 connectes via lead 100 to the count input of counter 80. The 1, 2 and 3 outputs of decoder 76 connect via leads 101, 102 and 103 to the count inputs of counters 84 and 88 and 92, respectively. The 4 output of decoder 76 connects via lead 104 to the clock input C of a J-K flip flop 105.

The 1 output of decoder 75 connects via lead 111 through a load resistor 211 to decimal point or period indicator 38. In similar manner the 2 and 3 outputs of decoder 75 connect to decimal point indicators 40 and 42, respectively, via leads 112 and 113 and appropriate load resistors 212 and 213. The 5 output of decoder 75 connects via lead 115 to inputs 216, 217 of a pair of gates 116 and 117.

The Q output of flip flop 105 connects via lead 120 to the other input 218 of gate 116, and also the K input of the flip flop 105, and to the input of an inverter 121. The output of inverter 121 connects through a load resistor 214 to decimal point indicator 44. The $\overline{Q}$ output of flip flop 105 connects via lead 122 to the remaining input 219 of gate 117, and also to the J input of the flip flop 105.

The output of gate 117 connects to lead 130. The output of gate 116 connects via lead 124 to a clear circuit 125. The output of clear circuit 125 connects via lead 126 to the clear inputs of counters 70, 80, 84, 88 and 92.

Figure 4:
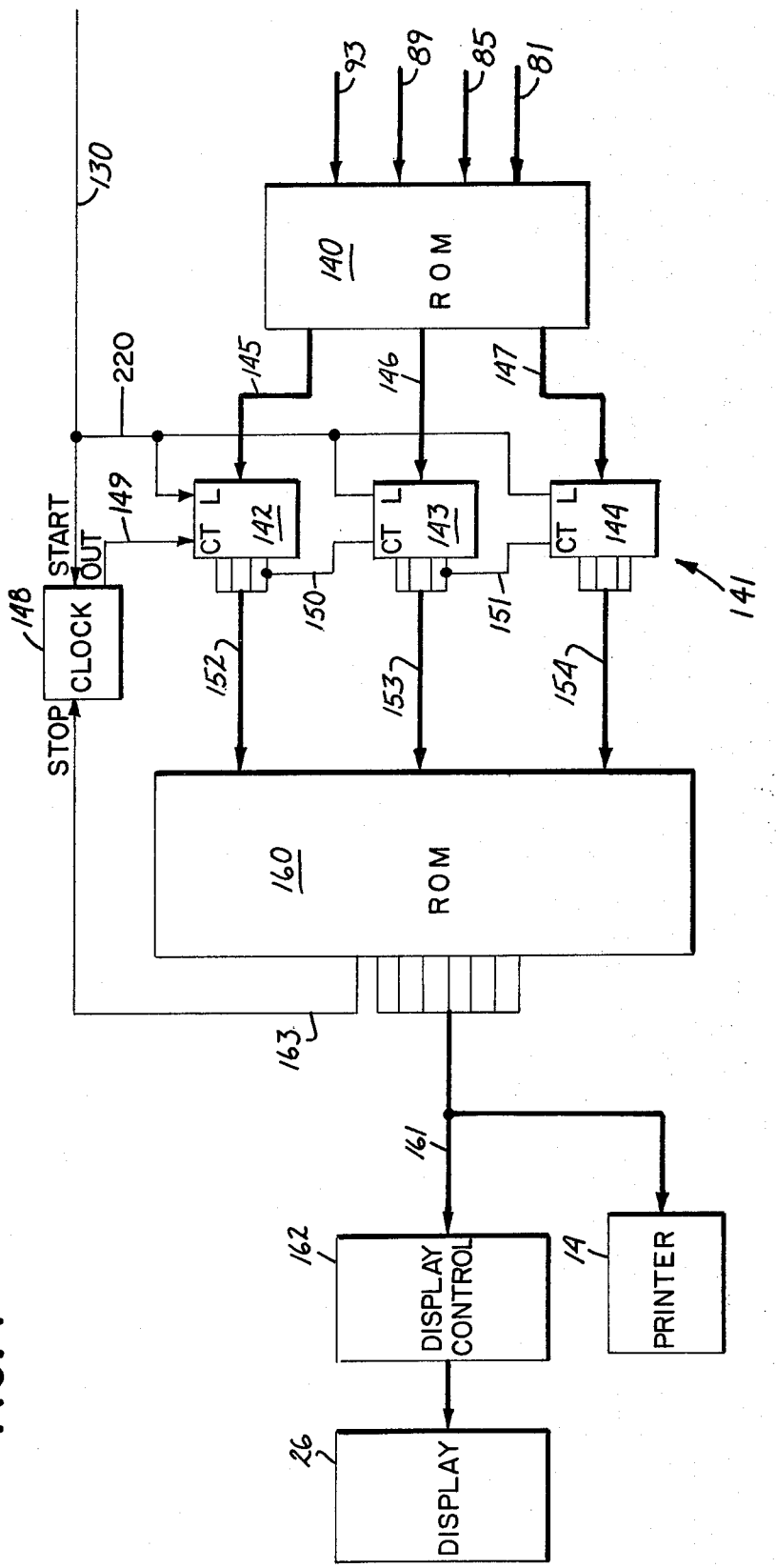
FIG. 4 is a schematic illustrating the functional connection of a display means with a memory.

Referring now to FIG. 4, branches of leads 81, 85, 89 and 93 connect to the addressing inputs of a read only memory (ROM) 140. The outputs of ROM 140 are applied to the preset inputs of a counter 141, which in the preferred embodiment comprises a three stage counter made up of counters 142, 143 and 144. Outputs of memory 140 connect to the preset inputs of counters 142, 143 and 144 by data trunks 145-147, respectively. The load inputs of these three counters 142, 143, and 144 connect to lead 130 via lead 220; a branch of lead 130 also connects to a clock 148. The output of clock 148 connects via lead 149 to the count input of counter 142. The most significant bit output of counter 142 connects via lead 150 to the count input of counter 143, and similarly the most significant output bit of counter 143 connects via lead 151 to the count input of counter 144.

The outputs of the three counters 142, 143, and 144 are applied to a read only memory (ROM) 160 by data trunks 152, 153 and 154. Read only memory 160 contains the actual messages to be displayed and printed, and the outputs of ROM 160 are applied via data trunk 161 to printer 14, and alphanumeric display means 26, by way of a display control 162. Display control 162 may be a shift register or multiplexer which is used for advancing the characters of the message through the display means 26 in serial fashion as they emerge from read only memory 160.

In the preferred embodiment, one bit of ROM 160 is reserved for stop codes for the messages. This reserved bit is applied via lead 163 to the stop input of clock 148.

OPERATION

Index numbers corresponding to the desired messages are selected by the operator as follows. Assuming that the circuitry is starting from an initial condition after having been cleared, counter 80 will be enabled by decoder 76, and pulses 73 from multivivrator 71 will be gated through decoder 76 to counter 80. In this initial state, inputs A, B and C of decoder 76 are all 0, but input D alternates with successive pulses from multivibrator 71. The effect of pulses at input D is to switch decoder 76 to its 8 output and its 0 output. But since the 8 output is not used, the effect of switching input D is simply to switch output 0 off and on to pass the pulses from the multivibrator 71 through to the counter 80. Later, when output 1 of decoder 76 is selected, the effect of the pulses at input D is to alternate decoder 76 from its 1 output to its 9 output, and since the 9 output is not used, the effect is again to transmit the pulses through the number 1 output. Similar operation takes place for the number 2, 3 and 4 outputs of decoder 76 when they are selected by counter 70.

Pulses from lead 100 cause counter 80 to be incremented on successive pulses. In the preferred embodiment, counter 80 is limited by a reset circuit to only two states, 0 and 1, because only 1777 (base 8) messages are provided. It is apparent that if a greater number of messages are desired, counter 80 can be allowed to go to higher numbers, and a correspondingly expanded memory can be provided to hold the additional messages.

In the preferred embodiment, the initial operation is to alternately display a 0 or a 1 at digital display 30. Assuming that the operator now wishes to display a message, and that he knows the index number for that message, either from memory, or by looking it up on a printed table, the operator then activates switch 50 during the instant of time that the appropriate digit, 0 or 1, is present in digital display 30. At the moment of activation of switch 50, multivibrator 71 is inhibited from providing further pulses, and counter 70 is incremented by 1 count. This activates the number 1 outputs of decoders 75 and 76. This has the effect of "freezing" the contents of counter 80 and enabling counter 84 via lead 101. At the same time, the number 1 output of decoder 75 lights decimal point indicator 38 which indicates to the operator that the digit in digital display 30 has now been selected and that the digit for digital dispay 32 will be next. Upon release of switch 50, multivibrator 71 is again enabled, and counter 84 is incremented. This causes the digits 0-7 to be successively, and cyclically, displayed in digital display 32. When the appropriate digit is reached, switch 50 is again activated. In case the operator was not ready and allowed the desired digit to go past, it is only necessary to wait through the count of 7, and the sequence will be repeated. When switch 50 is activated for the second digit, the digit in digital display 32 is held, decimal point indicator 40 is illuminated, and upon release of switch 50 digits start cycling through digital display 34.

The selection process is repeated for digital displays 34 and 36, and upon activation of switch 50 to "freeze"

the contents of digital display 36, counter 70 is again incremented, enabling output 4 of decoder 76. When switch 50 is again released, pulses from multivibrator 71 are gated through lead 104 to the clock input C of J-K flip flop 105, thus successively triggering the flip flop 105. The alternating output at lead 120 is inverted and used to alternately illuminate decimal point indicator 44.

The operator now has an opportunity to review the four digits selected to decide whether they are correct for the intended message. If they are in error, or if the operator has changed his mind, he may activate switch 50 again during an instant of time in which decimal point indicator 44 is not illuminated. This has the effect of clearing the selected four digits to start the selection process again. Specifically, the activation of switch 50 increments counter 70, which enables the number 5 output of decoder 75 which applies an enabling signal on lead 115 to both gates 116 and 117. With flip flop 105 in its set output so that decimal point indicator 44 is not illuminated, the enabling signal on lead 115 gates the Q output of flip flop 105 through gate 116 to clear circuit 125, which resets all counters 70, 80, 84, 88, 92.

On the other hand, if the index number is correct, the operator may then activate switch 50 during an instant of time in which decimal point indicator 44 is illuminated. This would have the effect of providing an enabling signal at lead 115 to gate the $\overline{Q}$ output of flip flop 105 through gate 117 to lead 130, which causes the desired message to be displayed by alphanumeric display means 26, and printed by printed 14, if it is turned on.

Referring now to FIG. 4, the index number selected and displayed is applied to ROM 140 in binary or octal form. The index number addresses the corresponding memory location within the ROM 140, causing the contents of the memory location to be read out through leads 145–147. At the time switch 50 is activated to print or display the selected message, the signal on lead 130 causes counter 141 to be loaded with the memory contents of ROM 140 corresponding to the selected message.

The number loaded into counter 141 is in turn a starting address for the corresponding message, which is stored in ROM 160, and this address is applied through leads 152–154 to ROM 160, causing it to read out the first character of the message on lead 161. At the same time, clock 148 is started by lead 130, and counter 141 is successively incremented from the starting address to cause ROM 160 to successively read out the characters of the message. In the preferred embodiment, one of the bits for each word in ROM 160 is reserved as a stop code, because the messages are of differing lengths. When the end of the message is reached, the stop code at lead 163 stops clock 148.

When a new message is to be displayed on the alphanumeric display means 26, several techniques can be utilized. One technique would be to leave the preceding message on the display means 26 and merely allow the new selected message to serially bump the old message off the display means 26. An alternative technique would be to program an erase message at a specific numerical address location, such as 0000. The selection of the address location 0000 would then erase the displayed message.

Numerous characteristics and advantages of the invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent extended by the broad general meaning of the terms in which the appended claims are expressed.

I claim:

1. A non-oral communication device comprising:
   a single electrical switch actuable by an operator and movable between a first and a second position;
   a memory for storing a plurality of plural word messages at a plurality of locations indexed by plural digit numbers, said memory being capable of storing said messages at locations indexed by numbers having at least three digits;
   a selector circuit for selecting one of said plural word messages by its indexed plural digit number;
   said selector circuit including numeral display means actuated by said switch, said numeral display means having at least three digit locations at which numerals can be displayed, means for cyclically indicating different numerals at each of said at least three digit locations, means actuated by said switch for choosing a displayed numeral at each of said at least three digit locations, said cyclical indicating means cyclically indicating different numerals at one of said at least three digit locations until said switch actuates said choosing means to choose a numeral being indicated, said numeral display means displaying a numeral chosen, said cyclical indicating means cyclically indicating different numerals at a succeeding digit location after a numeral has been chosen at a preceding digit location, and means actuated by said switch for transmitting the numerals chosen to said memory after a complete plural digit number of a desired plural word message has been chosen; and
   means for signaling a message display means to display a selected plural word message indexed by a chosen plural digit number.

2. A non-oral communication device in accordance with claim 1 wherein signaling means signals a printer to print a selected message.

3. A non-oral communication device in accordance with claim 1 wherein said selector circuit includes a digit select indicator means for indicating the digit location at which a numeral is to be chosen.

4. A non-oral communication device in accordance with claim 3 wherein said selector circuit includes a display-erase selector means actuated by said switch for either activating said signaling means or erasing a selected plural digit number and initiating said cyclical indicating means at a first digit location.

5. A non-oral communication device in accordance with claim 4 wherein said selector circuit includes a display-erase indicator light for cyclically indicating that the actuation of said switch would activate said display-erase selector means to either activate said signaling means or erase a selected plural digit number.

6. A non-oral communication device in accordance with claim 1 wherein said selector circuit includes a multivibrator, for cyclically generating a series of pulses, a digit decoder circuit, a plurality of counter circuits, said digit decoder circuit being connected to said multivibrator and said counter circuits for transmitting the pulses generated by said multivibrator to one of said counter circuits at a given time, and a separate driver/decoder circuit connected to each of said counter circuits for receiving signals indicative of numerals from an associated counter circuit and for decoding said signals from one of said counter circuits for display on said numeral display means.

7. A non-oral communication device in accordance with claim 6 wherein said selector circuit includes a digit select counter circuit actuated by said switch and connected to said digit decoder circuit, said digit select counter circuit transmitting a signal to said digit decoder circuit when said switch is actuated to stop the transmission of pulses from said multivibrator to a first counter circuit and to initiate the transmission of the pulses generated by said multivibrator to another counter circuit.

8. A non-oral communication device in accordance with claim 7 wherein said selector circuit includes a decimal point decoder circuit having inputs connected to said digit select counter circuit and a plurality of outputs each connected to one of a series of decimal point indicator lights, one of said indicator lights being disposed after each of said digit locations whereby said decimal point decoder circuit successively lights said indicator lights after a numeral has been selected at a digit location.

9. A non-oral communication device in accordance with claim 8 wherein a last of the series of decimal point indicator lights functions as a display-erase indicator light for cyclically indicating that the actuation of said switch would activate a display-erase selector means to either activate said signaling means or erase a selected plural digit number.

* * * * *